United States Patent [19]

Bogner et al.

[11] 4,376,089

[45] Mar. 8, 1983

[54] PARTICLE BOARD PROCESS USING POLYMERIC ISOCYANATE/RELEASE AGENT

[75] Inventors: Ben R. Bogner, Wheaton; Francis C. Grant-Acquah, Northbrook, both of Ill.

[73] Assignee: The Quaker Oats Company, Chicago, Ill.

[21] Appl. No.: 273,513

[22] Filed: Jun. 15, 1981

[51] Int. Cl.³ .............................................. B29J 5/00
[52] U.S. Cl. .................................................. 264/109
[58] Field of Search ......................................... 264/109

[56] References Cited

U.S. PATENT DOCUMENTS

| | | | |
|---|---|---|---|
| 4,257,995 | 3/1981 | McLaughlin et al. | 264/109 |
| 4,257,996 | 3/1981 | Farrissey et al. | 264/109 |
| 4,258,169 | 3/1981 | Prather et al. | 264/109 |

*Primary Examiner*—James R. Hall
*Attorney, Agent, or Firm*—Gerald T. Shekleton

[57] ABSTRACT

A binder system is disclosed which incorporates an internal release agent and comprises a mixture of polyisocyanate resin, furfural and an ester of phosphoric acid. In the process of the invention the ester of phosphoric acid is placed into solution with furfural and subsequently blended with the polyisocyanate. Increased stability of the binder system is observed as well as providing for increased mold releasing capabilities.

3 Claims, No Drawings

PARTICLE BOARD PROCESS USING POLYMERIC ISOCYANATE/RELEASE AGENT

This application relates to polymeric isocyanate binders and more particularly to a method for forming an isocyanate binder system having an internal release agent and the resinous composition therefor.

Organic polyisocyanates have been recognized for some time as useful competitive alternate binders in the manufacture of particle boards. As known in the art the isocyanate binders, whether in solution or emulsified, are mixed with the wood chip particles utilized as the base for the particle board. A wood chip and binder mixture is then formed into a mat and hot-molded in the desired size. A principal disadvantageous of the use of isocyanate has been the tendency of the molded particle board to adhere to the cauls of the press thereby creating a buildup of wood particles on the caul, which causes succeeding particle board surfaces to be unnecessarily rough. Such a poor release of the cured particle board from the mold or caul surface creates difficulty in the automatic handling of the cauls.

The above drawbacks to the use of organic polyisocyanates as particle board binders can be minimized through the incorporation of certain acid phosphates, their derivatives and mixtures thereof as internal release agents with the organic polyisocyanate, as taught in U.S. Pat. No. 4,257,995. However, when the organic polyisocyanate binders are mixed with such phosphate compounds as taught in U.S. Pat. No. 4,257,995 it has been found the isocyanate mixture suffers from a short shelf life and thus must be used within a short period of time in order to avoid the formation of a hard skin or barrier on the upper surface of the isocyanate mixtures. Because of the existence of this barrier the shelf life of the resulting isocyanate mixture becomes relatively short, thereby limiting the usefulness and effectiveness of an organic polyisocyanate binder incorporating such phosphate internal release agents.

SUMMARY OF THE INVENTION

Therefore an object of the subject invention is an improved binder with internal release agent for use with particle boards and the like.

Another object of the subject invention is an improved binder comprising a blend of isocyanate resin and organic esters of ortho-phosphoric acid.

A further object of the subject invention is an improved isocyanate binder having an internal release agent comprising an organic ester of ortho-phosphoric acid where the release agent blended as a furfural solution with the polyisocyanate, for increased stability and improved physical properties on curing.

These and other objects are obtained in accordance with the subject invention wherein there is provided on improved binder which incorporates an internal release agent of an organic ester of ortho-phosphoric acid. More particularly, the invention comprises an improved process for the preparation of particle board in which the wood chips are contacted with a polyisocyanate having about 0.1 percent to 5 percent by weight of the polyisocyanate resin solids present of an organic ester of ortho-phosphoric acid of the formula:

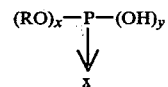

including salts and derivative mixtures of such compounds, and polyphosphates of the formula:

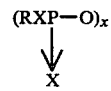

including the cyclometaphosphates (n−3). In the above formulae each "R" is independently selected from the class consisting of an alyky group having from 3 to 35 carbon atoms inclusive; $X = 1-3$ and $Y = 0-2$. X in each instance may be oxygen or sulfur. Related phosphoric acid esters may be utilized as release agents of the subject invention as further set forth and described in the above identified U.S. Pat. No. 4,257,995.

In the process of the present invention a phosphoric acid ester as identified above is blended with furfural in the desired amounts and, just prior to the time of use, is further blended with the organic polyisocyanate in the desired amounts. The resulting isocyanate binder system, when mixed with wood chips, yields a particle board with good release properties without losing any of the desirable physical properties of a particle board as measured by the internal bond, modulus of rupture, the percent swell, and similar values.

DETAILED DESCRIPTION OF THE INVENTION

The binder system of the subject invention comprises a copolymer including a combination of furfural, an isocyanate resin, and an organic ester of phosphoric acid. With the binder system of the subject invention, particle board, among other articles, may be produced by bonding together wood chips or other cellulosic or organic material capable of being compacted, using heat and pressure in the presence of the binder system.

The polyisocyanate component of the binder system can be any organic polyisocyanate which contains at least two isocyanate groups per molecule. Illustrative of organic polyisocyanates are resin based diphenylmethane diisocyanate, m- and p-phenylene diisocyanates, chlorophenylene diisocyanate,α,α,-xylene diisocyanate, 2,4- and 2,6-toluene diisocyanate and the mixtures of these two isomers which are available commercially, triphenylmethane triisocyanates, 4,4'-diisocyanate diphenyl ether, and polymethylene polyphenyl polyisocyanates. Other polyisocyanates are also available in various modified forms and are included within the scope of the subject invention. The polyphenyl polyisocyanates are the preferred polyisocyanates for use in the binder system of the subject invention. Particularly preferred polyphenyl isocyanates are those resins based on 4,4'-diphenylmethane diisocyanate.

The esters of phosphoric acid which may be utilized as release agents in the binder system of the subject invention are, as set forth above, those phosphates of the formula:

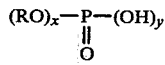

including salts and derivative mixtures of such compounds, and those polyphosphates of the formula:

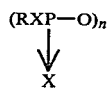

including the cyclometaphosphates (n=3). where x=1-3, Y=0-2 and R is selected from an alkyl group having from 3-35 carbon atoms. The salts of such compounds, as well as pyrophosphates and other derivatives of such compounds are included within the scope of the invention. X in each instance may be oxygen or sulfur. A primary consideration in determining inclusion within the scope of the invention is its solubility or its capability of being otherwise placed in solution, such as by emulsification, in furfural within the limits set forth below.

The wood particles of preference for use in forming the particle boards with the binder of the subject invention are those obtained from the Douglas fir, preferably in the form of peeler cores, a by-product generally available from plywood mills. The peeler cores are chipped green and then processed through a Pallman flaker to yield a commercial type of flake suitable for structural particle board, as known in the art. After drying, the flakes were screened to remove the fines and packaged in large polyethylene bags until used. As known in the art, particles of other cellulosic materials such as shredded paper, pulp or vegetable fibers such as corn stalks, straws, bagasse and the like, and of non-cellulosic materials such as scrap polyurethane, polyisocyanurate and like polymer foams can also be used. The methods for producing suitable particles are well known and conventional. If desired, mixtures of cellulosic particles may be used.

The binder composition of the subject invention is formed by initially mixing the phosphate release agent with the furfural. Such a release solution enjoys an extended shelf life, showing little or no increase of viscosity over a period of time. The release solution is preferably retained separate from isocyanate resin until just prior to use when it may be admixed to the isocyanate resin. While some increase in viscosity has been observed on standing, the observed shelf life of the isocyanate release solution appears sufficient to preserve its capabilities for at least a couple of days, and certainly for the duration of a shift or overnight at room temperature. These properties represent a vast difference from an isocyanate resin mixture with the phosphate release agent alone which became unusable within a few hours after being mixed together, as stated previously.

The phosphate furfural mixture is formulated to allow addition of both ingredients to the isocyanate resin in the desired amounts. While the phosphate may be added in amounts from 0.1% to 5.0% by weight of the isocyanate resin and the furfural may be added in amounts from 1-50% by weight of the isocyanate resin, the preferred mixture contains from about 0.5-1.5% phosphate and about 15% to 25% furfural, both by weight of the isocyanate resin. The most preferred mixture contains about 1% phosphate and 20% furfural both by weight of the isocyanate resin.

Particle board is traditionally fabricated by spraying the cellulosic or wood chip particles with the components of the binder composition either separately or in combination while the particles are tumbled or agitated in a blender or like mixing apparatus. Generally the binder system is added in an amount equal to 2-8 percent by weight of the cellulosic material based on the dry weight of the particles. If desired other material such as fire retardants, pigments and the like, may also be added to the particles during the blending stage.

After blending sufficiently to form a uniform mixture the coated particles are formed into a loose mat or felt, preferably containing between about 4 percent and 18 percent moisture by weight. The mat is then placed in a heated press (300°-450° F.) between caul plates and compressed (300-700 psi) to consolidate the particles into a board. Pressing times, temperatures, and pressures may vary widely, depending on the thickness of the board produced, the desired density of the board, the size of the particles used and other factors well known in the art. The examples cited herein below were boards prepared with 3 percent resin solids on an oven dry wood basis to form 3/8" thick boards, felted to a target density of 0.6 g/cc and pressed at 500 psi and 350° F. for 7 minutes. The boards thus prepared were tested for modulus of rupture (MOR), internal bond (IB) and percent thickness swell. In addition, a wet MOR or bending strength after 2 hour boil—15 minute cold soak, was conducted. The results of these tests are TABLE I[a]

| Ingredients | A | B | C | D |
|---|---|---|---|---|
| Isocyanate[b] | 2.4 | 2.40 | — | 3.0 |
| Furfural | .6 | .57 | — | — |
| Phosphate Ester[c] | — | .03 | — | — |
| Wood Chips (dry) | 100.0 | 100.0 | 100.0 | 100.0 |
| Phenol-formaldehyde resin | — | — | [d] | — |
| IB (psi) | 130 | 136 | 65 min. | 155 |
| MOR (psi) | 2513 | 2562 | 1800 min. | 2616 |
| MOR (wet) (psi) | 1294 | 1565 | — | 861 |
| % Swell | 35 (2 hr. boil) | 33 (2 hr. boil) | 15 max. (24 hr. soak) | 14 (24 hr. soak) |

[a]The experimental error which might be observed with these values should be approximately +15%.
[b]Diphenylmethane diisocyanate resin blend available from Mobay Chemical Corporation.
[c]A mixture principally comprised of lauryl diacid phosphate, and dilauryl mono-acid phosphate, available from E. I. duPont de Nemours and Company as Zelec UN.
[d]Values given are standards promulgated by The National Particleboard Association, August, 1973, NPA 4-73. Resin content is generally 7%.

The board formed from mixture A of Table I caused a build-up of wood particles on the caul surface because of adhesion of the board to the caul. Such build-up caused an unacceptable rough surface on the boards which got worse with the molding of successive boards. The board formed from mixture B of Table I provide good release of the board from the mold cauls. The cauls remained clean during successive board moldings.

As can be seen from the physical properties of those boards listed in Table I, the boards prepared utilizing isocyanate resin were substantially equivalent to the board prepared with phenol formaldehyde resin, the current favorite in the industry. In addition those boards prepared with the isocyanate blend with furfural and the acid phosphate also appeared equivalent in all physical properties to those boards prepared with isocyanate resin alone. It may therefore be concluded that the addition of both the furfural and the phosphate release agent did not materially adversely affect the physical properties of particle board prepared from such mixtures, and, since the materials or ingredients used are of a less expensive nature than isocyanate, actually result in a less expensive, and therefore more desirable product.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A process for the preparation of a particle board comprising the steps of mixing furfural and a phosphate to form a stable release agent solution, blending a polyisocyanate with said release agent solution to form a binder system, mixing said binder system with wood chip particles and molding said mixture of said binder system and cellulosic material under heat to form a board of good strength and water resistance.

2. The process of claim 1 wherein said binder system and said wood chip particles are molded at 350° F. for 4½ minutes at 500 psi.

3. The process of claim 1 wherein said release agent solution is blended with said polyisocyanate to form a solution having a furfural content of from 0-50 percent by weight, and a content of phosphate from 0.1-5 percent by weight of the isocyanate resin solids.

* * * * *